J. B. CLERMONT.
APPARATUS AND PACKAGE FOR FORMING SOLUTIONS BY PERCOLATION.
APPLICATION FILED AUG. 25, 1916.
1,377,316.
Patented May 10, 1921.
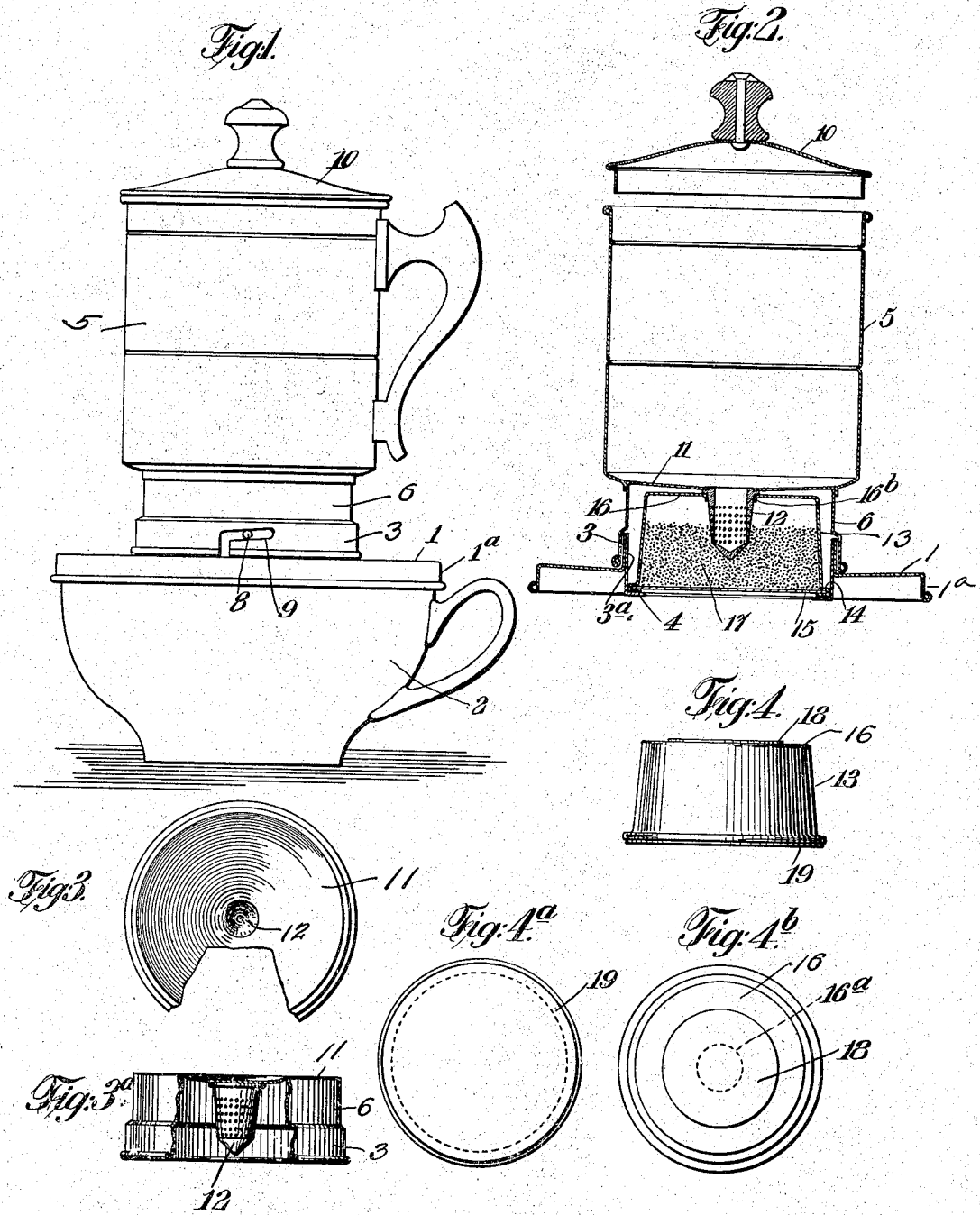
INVENTOR
John B. Clermont
BY his ATTORNEYS

UNITED STATES PATENT OFFICE.

JOHN B. CLERMONT, OF NEW YORK, N. Y.

APPARATUS AND PACKAGE FOR FORMING SOLUTIONS BY PERCOLATION.

1,377,316.   Specification of Letters Patent.   Patented May 10, 1921.

Application filed August 25, 1916. Serial No. 116,797.

*To all whom it may concern:*

Be it known that I, JOHN B. CLERMONT, of New York, in the county of Bronx and in the State of New York, have invented a certain new and useful Improvement in Apparatus and Package for Forming Solutions by Percolation, and do hereby declare that the following is a full, clear, and exact description thereof.

The object of my invention has been to provide an apparatus for forming solutions by percolation, and a package of material for use in such apparatus, which shall be adapted, among other uses, for use in making coffee, and which shall have any or all of the following advantages:

That of great simplicity; that of enabling infusions to be made of such substances as coffee by passing the water or other liquid but once through the material being leached; that of enabling the material being leached to be introduced into the apparatus and remain therein in the form of a package so as to provide not only for simplicity of operation, but for easily cleansing the apparatus after the operation, and to such ends my invention consists in the hereinafter described apparatus and package for forming solutions by percolation.

In the accompanying drawing,

Figure 1 is an elevation of the container complete supported on an ordinary large porcelain cup. It is charged with a cartridge and the necessary liquid up to the upper embossed line which marks its full capacity.

Fig. 2 is a vertical cross section through the container and the inserted cartridge. The under vessel or cup is removed and the lid is slightly raised.

Figs. 3 and 3ª are respectively a top plan and a side view of the intermediate portion of the container, having a portion broken away to show the nozzle.

Figs. 4, 4ª, and 4ᵇ are respectively a side view, a bottom view and a top plan of a cartridge as it appears before it is inserted into the container.

My invention is capable of use for many different purposes, and in many different forms; and while I have chosen for illustrating it the best embodiment of my percolating apparatus which is known to me, such apparatus and package for use therewith are to be regarded as only one of many possible embodiments, and my invention is not to be restricted thereto.

The illustrated embodiment of my invention is adapted particularly for the manufacture of coffee. In such embodiment, I have shown a base 1 which is adapted to fit over a cup 2 or other vessel into which the made coffee is to drop, such cover having a flange 1ª at its outer edge to prevent its escaping from off the cup. In the center of the base is a sleeve 3 which is formed on or attached to the base, and which, in the present instance, carries a tube 3ª that has an inturned flange 4 at its lower edge. A pot or body 5 is provided with a neck 6 that is adapted to fit the sleeve 3, in the present instance fitting the outside of the sleeve. A bayonet joint is formed between the sleeve and the neck by pins 8 on the sleeve, adapted to engage cam slots 9 in the neck. A cover 10 is provided for closing the upper end of the pot. In the present embodiment of my invention I provide a bottom 11 which closes the lower end of the pot 5 except that attached to the bottom is a preferably conical nozzle 12, which is pointed on its lower end and the wall of which is perforated.

The coffee or other material from which the infusion is to be formed is provided in what I term "cartridges," or packages adapted to be received within and to make a substantially water-tight connection with the pot, and preferably with the neck of the pot, such packages preferably having substantially vertical walls 13 that are sufficiently impervious to water or other infusing liquid so as to compel all the water passing through the neck to pass through the cartridge and thus to insure that the liquid shall all pass through substantially the whole layer of solid material from which the infusion is to be made. I prefer to make the vertical walls of the cartridge of such material as sheet metal, or sized paper, but it is obvious that a less waterproof material could be used. The lower end of the cartridge is provided with an outwardly turned flange or shoulder 14, upon which is seated a disk 15 of material which will permit the passage of the water or other liquid while preventing the escape of the solid material, and such disk may be formed of unsized paper like blotting paper. The material forming the shoulder 14 is preferably turned over underneath the disk 15 to secure it in place. I preferably make the top 16 of the package sufficiently stiff, as by forming it up in one piece with the material of the side walls 13 of the package, so that, the package being supported by the flange 4, and the parts being properly proportioned, the engagement of the bayonet joint shall so force the nozzle into an opening $16^a$ in the top 16 and into firm contact with a lip or flange $16^b$ extending around the same as to make a substantially water-tight joint therewith and compel all water going through the nozzle to pass through the coffee 17 and the filter paper 15. Both the upper and lower ends of the cartridge may be sealed as by seals 18 and 19 formed, for instance, of paraffin tissue paper, and which are easily torn off.

In the use of my apparatus and cartridge, the cartridge, loaded with pulverized coffee, is made ready for use by tearing off the thin seals 18 and 19, and is placed on the flange 4 of the cover 1. The neck 6 is then placed over the sleeve 3 and by means of the bayonet joint is caused to force the nozzle tightly into the hole in the top of the package and to clamp the shoulder 14 against the flange 4, so as to make a substantially water-tight joint. The pot is supported upon the cup or other receptacle which is to receive the coffee extract, and the required amount of water is poured into the pot through its top. The perforated nozzle not only sprays the water substantially evenly through the coffee, but it allows the air in the package to escape and so presents the water to the mass of coffee grains that it is enabled to penetrate the latter, and the formation of a sufficient "skin" effect at the perforations to prevent the escape of the air, is prevented. The point on the nozzle also enables the nozzle to be forced through the sealing disk 18, if desired, without removing the latter. The water enters the nozzle and by its perforations is sprayed laterally on and through the coffee and percolates through the coffee, and as it can only enter through the perforations of the nozzle and can only escape through the porous paper disk, all the water is compelled to pass entirely through the layer of coffee and is all thus substantially equally presented to the pulverized coffee. The result is that the water is in contact with coffee long enough to take up its beneficial extracts but is not in contact long enough to dissolve its harmful ingredients. In this way, although the water may pass but once through the ground coffee, fluid coffee of the finest flavor may be obtained and with the least amount of deleterious substances therein, and it is found that substantially all of the beneficial materials in the coffee can be extracted with the single passage of the water therethrough.

It will be seen that my apparatus and cartridge have, among others, the following advantages in addition to those just described:

The use of the cartridge enables the material being leached to be introduced into the apparatus and removed therefrom without ever losing control of the material, the used coffee grounds being perfectly removed by simply removing the package. Thus not only is the operation of charging and emptying the percolator performed with great simplicity and cleanliness, but an infusion is obtained of the greatest possible strength, and all the material being leached is insured of thorough and equal treatment by the water or other liquid. Regulating the size of the cartridge is a convenient and accurate means for measuring the proper amount of coffee or other material to form the desired quantity of the infusion. The apparatus is of great simplicity and can be used out of doors without other facilities than those for supplying hot water.

It is obvious that various changes can be made in the above-described embodiment of my invention which would be within the scope of the invention. For instance, the cartridges may be charged with more than a single substance, such, for example, as with coffee and milk in a dried form, as well as sugar.

I claim:

1. In a percolating apparatus, the combination of a receptacle and a base, each having part of an inclosure, means carried thereby adapted to so engage the hereinafter-mentioned cartridge as to make a water-tight connection with its sides, said receptacle having a bottom provided with a perforated nozzle, and a cartridge having a pervious bottom and having a top with an opening adapted to receive said nozzle.

2. In a percolating apparatus, the combination of a receptacle and a base, each having part of an inclosure, means carried thereby adapted to so engage the hereinafter-mentioned cartridge as to make a water-tight connection with its sides, said receptacle having a bottom provided with a perforated nozzle, and a cartridge having a pervious bottom and having a top with an opening adapted to receive said nozzle, said nozzle being tapered.

3. In a percolating apparatus, the combination of a receptacle and a base, each having part of an inclosure, means carried thereby adapted to so engage the hereinafter-mentioned cartridge as to make a water-tight connection with its sides, said receptacle having a bottom provided with a nozzle, and a cartridge having a pervious bottom and having a top with an opening adapted to receive said nozzle, said nozzle being tapered and having perforated sidewalls.

4. In a percolating apparatus, the combination of a receptacle and a base, each having part of an inclosure, means carried thereby adapted to so engage the hereinafter-mentioned cartridge as to make a water-tight connection with its sides, said receptacle having a bottom provided with a nozzle, and a cartridge having a pervious bottom and having a top with an opening adapted to receive said nozzle, said nozzle being tapered and having perforated side-walls and having a pointed imperforate bottom.

5. In a percolating apparatus, the combination of a receptacle and a base, each having one of a pair of telescopic parts, the base also having a flange adapted to support the hereinafter-mentioned cartridge, said receptacle having a bottom provided with a perforated nozzle, and a cartridge having a pervious bottom and having a top with an opening adapted to receive and to make a substantially water-tight connection with said nozzle.

6. In a percolating apparatus, the combination of a receptacle and a base, each having one of a pair of telescopic parts, the base also having a flange adapted to support the hereinafter-mentioned cartridge, said receptacle having a bottom provided with a perforated nozzle, and a cartridge having a pervious bottom and having a top with an opening adapted to receive and to make a substantially water-tight connection with said nozzle, said nozzle being tapered.

7. In a percolating apparatus, the combination of a receptacle and a base, each having one of a pair of telescopic parts, the base also having a flange adapted to support the hereinafter-mentioned cartridge, said receptacle having a bottom provided with a nozzle, and a cartridge having a pervious bottom and having a top with an opening adapted to receive and to make a substantially water-tight connection with said nozzle, said nozzle being tapered and having perforated side walls.

8. In a percolating apparatus, the combination of a receptacle and a base, each having one of a pair of telescopic parts, the base also having a flange adapted to support the hereinafter-mentioned cartridge, said receptacle having a bottom provided with a nozzle, and a cartridge having a pervious bottom and having a top with an opening adapted to receive and to make a substantially water-tight connection with said nozzle, said nozzle being tapered and having perforated side walls and having a pointed imperforate bottom.

In testimony that I claim the foregoing I have hereunto set my hand.

JOHN B. CLERMONT.